United States Patent
Yoon et al.

(10) Patent No.: US 7,730,115 B2
(45) Date of Patent: Jun. 1, 2010

(54) SYSTEM, MICROCONTROLLER AND METHODS THEREOF

(75) Inventors: Joong-Chul Yoon, Seoul (KR); Kikuchi Takashi, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1441 days.

(21) Appl. No.: 11/084,817

(22) Filed: Mar. 21, 2005

(65) Prior Publication Data
US 2006/0053269 A1    Mar. 9, 2006

(30) Foreign Application Priority Data
Aug. 11, 2004    (KR) .................... 10-2004-0063203

(51) Int. Cl.
*G06F 7/58* (2006.01)
(52) U.S. Cl. .................................................... 708/250
(58) Field of Classification Search ................. 708/250
See application file for complete search history.

(56) References Cited

U.S. PATENT DOCUMENTS

| | | | | |
|---|---|---|---|---|
| 4,749,982 A | * | 6/1988 | Rikuna et al. ............ | 340/146.2 |
| 5,341,120 A | * | 8/1994 | Nakajima ................ | 340/146.2 |
| 5,761,521 A | * | 6/1998 | Chilinski et al. ............... | 712/1 |
| 5,828,752 A | * | 10/1998 | Iwamura et al. ............... | 380/46 |
| 5,935,002 A | * | 8/1999 | Falciglia ..................... | 463/19 |
| 6,834,802 B2 | * | 12/2004 | Sukeda et al. ............... | 235/451 |
| 2003/0199312 A1 | * | 10/2003 | Walker et al. ................. | 463/25 |
| 2004/0177243 A1 | * | 9/2004 | Worley, Jr. .................... | 713/2 |

FOREIGN PATENT DOCUMENTS

| | | |
|---|---|---|
| JP | 2001-266651 | 3/2003 |
| KR | 10-1999-0042543 | 5/2000 |
| KR | 10-2000-0019209 | 1/2001 |
| KR | 10-2002-0040539 | 12/2003 |

* cited by examiner

*Primary Examiner*—David H Malzahn
(74) *Attorney, Agent, or Firm*—Harness, Dickey & Pierce, P.L.C.

(57) ABSTRACT

A microcontroller for securing data. The microcontroller may be included within a system. The microcontroller reads first and second data from first and second storages, respectively. The microcontroller compares the read first and second data. The microcontroller permits execution of a command based on a result of the comparison.

29 Claims, 5 Drawing Sheets

SYSTEM, MICROCONTROLLER AND METHODS THEREOF

PRIORITY STATEMENT

This application claims priority of Korean Patent Application No. 2004-63203, filed on Aug. 11, 2004 in the Korean Intellectual Property Office, the disclosure of which is incorporated herein in its entirety by reference.

BACKGROUND OF THE INVENTION

1. Field of the Invention

The present invention relates generally to a system including a microcontroller and methods thereof and a microcontroller and methods thereof, and more particularly to a system including a microcontroller for securing data and methods thereof, and a microcontroller for securing data and methods thereof.

2. Description of Related Art

Conventional memory cards may include storage and a controller for controlling the storage. Memory cards including a flash memory may be referred to as flash cards. Because memory cards may be capable of storing a higher amount of data (e.g., hundreds of megabytes of data), they may be employed within electronic devices (e.g., digital cameras, camcorders, game machines, etc.). Examples of memory card classes may include multimedia cards (MMC), secure digital (SD) cards, compact flash cards, memory sticks, etc. The various classes of memory cards may include different performance characteristics (e.g., operating speed, memory size, etc.). Data stored on memory cards may not be secure. Data in external storage may include a higher level of security. However, data may not be secure during a data operation of a memory card (e.g., a write operation in the external storage).

Conventional smart cards may be fabricated as flat, rectangular pieces of plastic (e.g., resembling credit cards in size, shape, and thickness) and may include an integrated circuit (IC) chip. The IC chip may include a microprocessor, a card operating system, a security module, and/or a memory. Smart cards may include a lower risk of data loss and a higher level of security as compared to magnetic stripe cards. Newer smart cards may require a higher capacity of external data storage (e.g., hundreds of megabytes) because embedded memory may include a lower capacity (e.g., one megabyte or less).

FIG. 1 illustrates a conventional smart card system 105. As shown, the smart card system 100 may include a microcontroller 100 and an external storage 170. The microcontroller 100 may include a random access memory (RAM) 120, a read-only memory (ROM) 130, an internal storage 140, a central processing unit (CPU) 150, a host interface 110 communicating with a host (not shown), and an external interface 160 communicating with the external storage 170, each of which may be connected to a system bus 180. The CPU 150 may read data from the external storage 170 in response to a command from the host.

The CPU 150 may also write data to the external storage 170 in response to a command from the host.

The external storage 170 may be vulnerable to a malicious user (e.g., a hacker). For example, if a user uses the smart card system 100 after a hacker modifies the external storage 170, the data stored in the external storage 170 may not be intended for the user.

SUMMARY OF THE INVENTION

An example embodiment of the present invention is a microcontroller, including a data generator for generating first data, a first storage for storing the first data and an address of a second storage and a central processing unit (CPU) for executing a command based on a comparison between second data and the first data.

Another example embodiment of the present invention is a method of securing data, including reading first data from a first storage, reading second data from a second storage, extracting third data from the first data, extracting fourth data from the second data, comparing the third and fourth data and executing a command based on a result of the comparison.

Another example embodiment of the present invention is a microcontroller, including a data generator for generating first data, a first storage for storing the first data and an address of a second storage and a decryption unit for extracting third data from the first data and fourth data from the second data, a CPU for executing a command based on a comparison between third data and the fourth data.

Another example embodiment of the present invention is a method of securing data, including reading first data from a first storage, reading second data from a second storage, comparing the first and second data and executing a command based on a result of the comparison.

BRIEF DESCRIPTION OF THE DRAWINGS

Example embodiments of the present invention will become more apparent by describing in detail example embodiments thereof with reference to the attached drawings in which.

DETAILED DESCRIPTION OF THE EXAMPLE EMBODIMENTS OF THE PRESENT INVENTION

Figure 1:
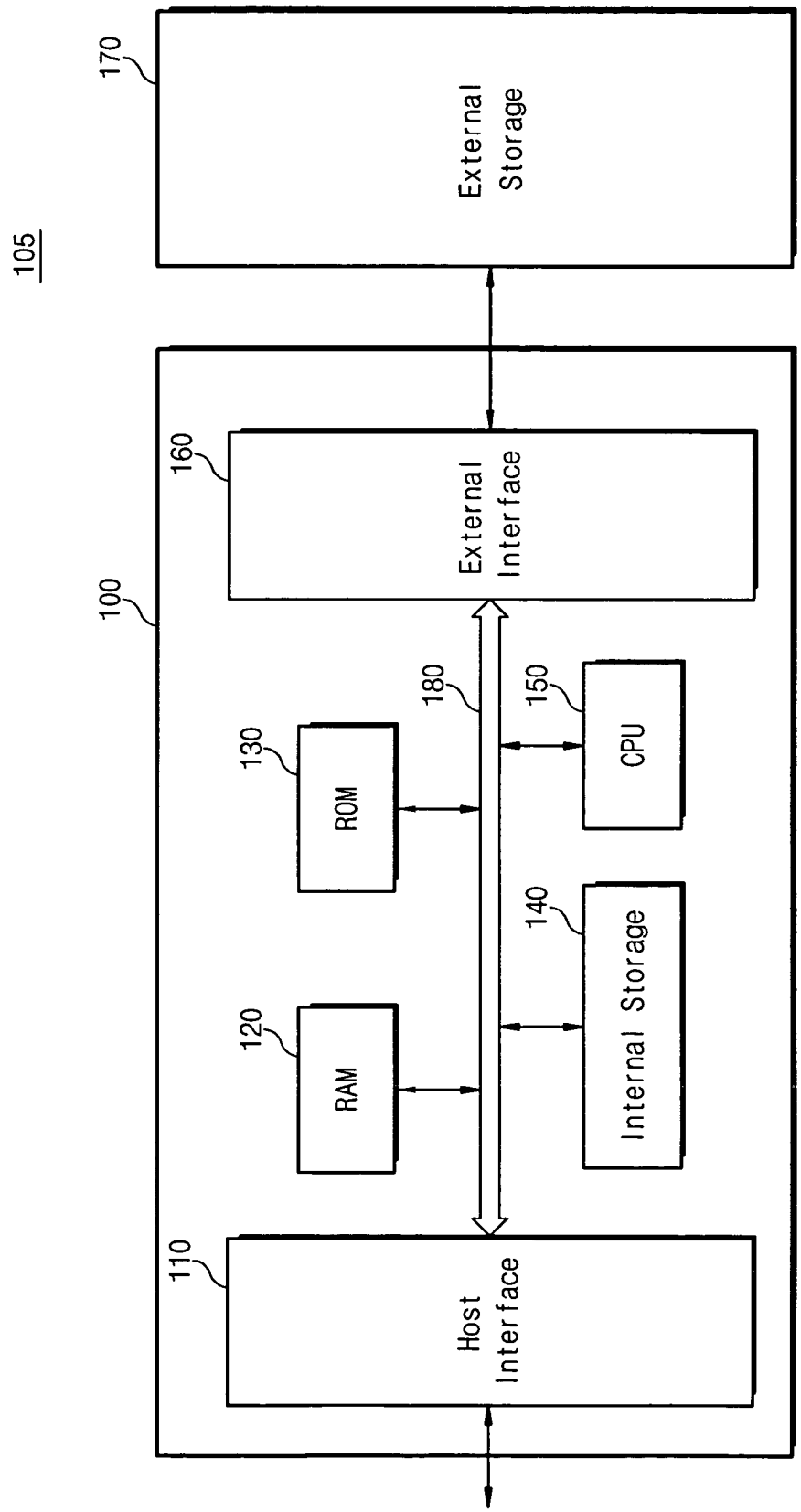
FIG. 1 illustrates a conventional smart card system.

Hereinafter, example embodiments of the present invention will be described in detail with reference to the accompanying drawings.

In the Figures, the same reference numerals are used to denote the same elements throughout the drawings.

Figure 2:
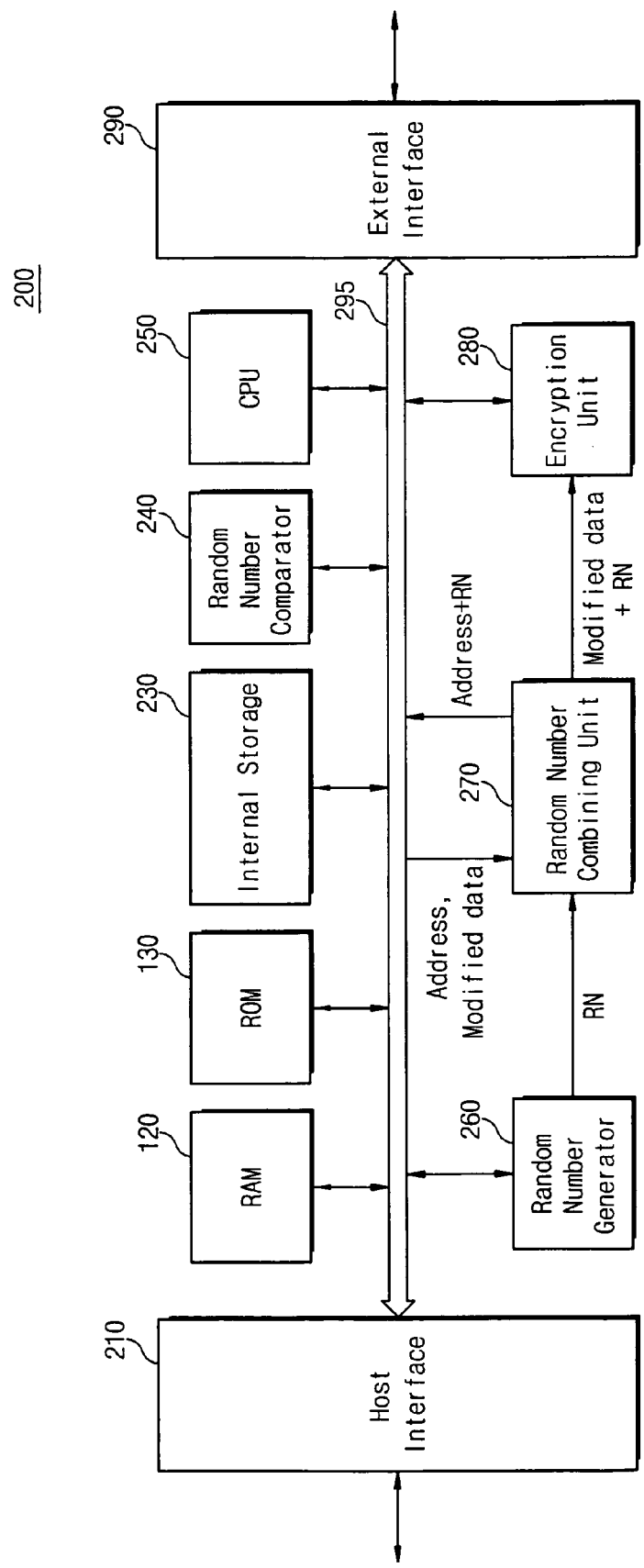
FIG. 2 illustrates a microcontroller according to an example embodiment of the present invention.

FIG. 2 illustrates a microcontroller 200 according to an example embodiment of the present invention.

In the example embodiment of FIG. 2, the microcontroller 200 may include a random access memory (RAM) 120, a read-only memory (ROM) 130, an internal storage 230, a random number comparator 240, a central processing unit (CPU) 250, a random number generator 260, a random number combining unit 270, and/or an encryption unit 280.

In the example embodiment of FIG. 2, the microcontroller 200 may communicate with a host (not shown) through a host interface 210 and may communicate with an external storage (not shown) through an external interface 290.

In another example embodiment of the present invention, the components (e.g., RAM 120, ROM 120, Internal Storage 230, etc.) in the microcontroller 200 may be interconnected through a system bus 295.

In another example embodiment of the present invention, data stored in the respective components and/or data output from the components may be transferred to other components through the system bus 295.

In another example embodiment of the present invention, the external storage may include a hard disk and/or a non-volatile memory (e.g., a flash memory) and may include a higher storage capacity for storing data as compared to the internal storage 230. It is understood that the external storage is not limited to flash storage, but may include any type of well-known memory storage device.

In another example embodiment of the present invention, the random number comparator 240 and/or the random number combining unit 270 may include an integrated circuit and/or an embedded program (e.g., firmware).

Figure 3:
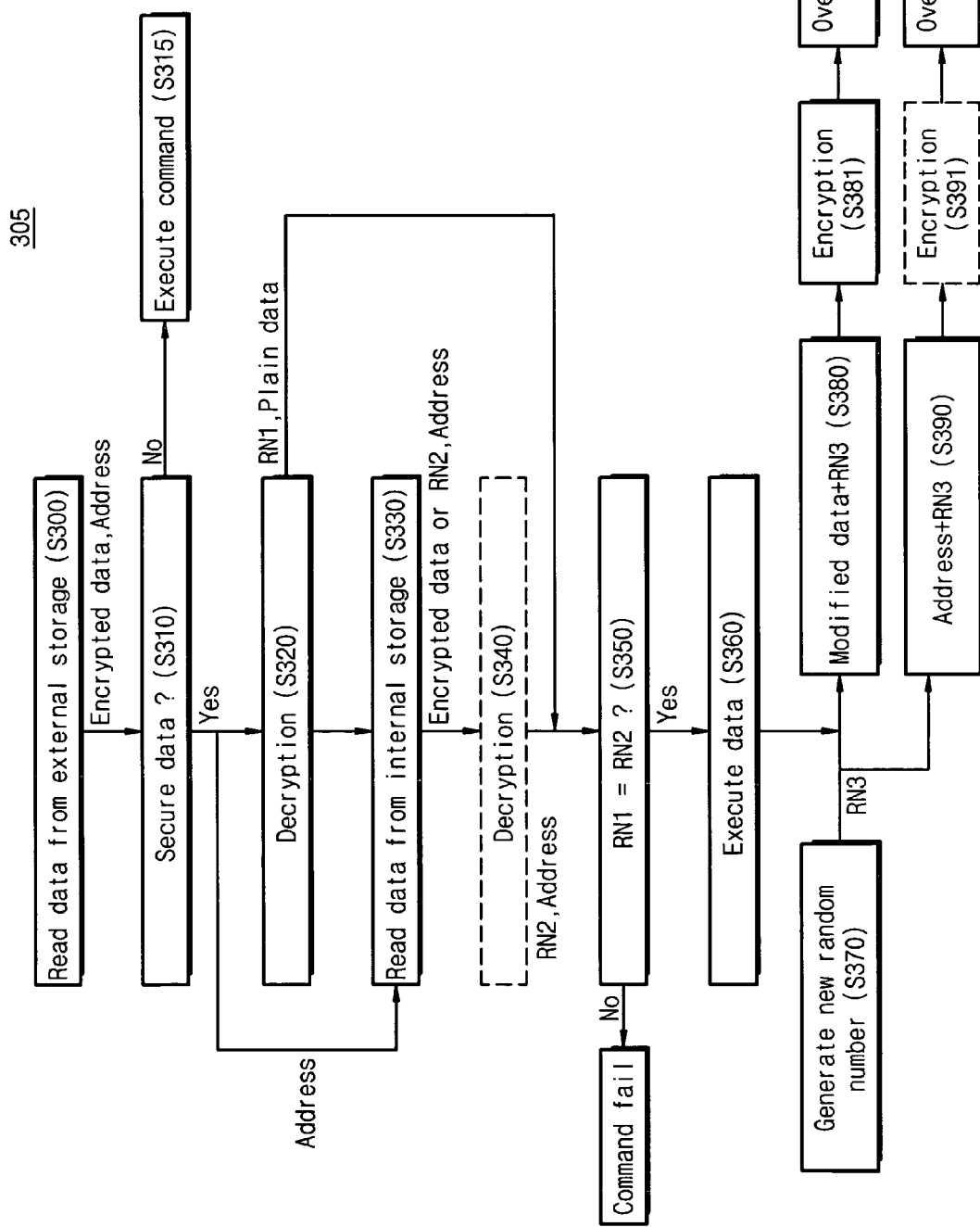
FIG. 3 illustrates a flowchart of a process according to another example embodiment of the present invention.

FIG. 3 illustrates a flowchart of a process 305 according to another example embodiment of the present invention.

In an example embodiment of the present invention, the process 305 may be performed by the microcontroller 200 of FIG. 2.

An example will now be given wherein the process 305 of FIG. 3 is described as performed by the microcontroller 200 of FIG. 2.

Referring to FIGS. 2 and 3, the CPU 250 may read data from the external storage (not shown) (at S300) and may determine whether the read data is secure data (at S310). If the read data is not secure data, the CPU 250 may execute a command from the host (at S315). If the read data is secure data, the read data may be decrypted (e.g., if the read data is encrypted) in order to generate a random number RN1 and plain data (at S320).

In another example embodiment of the present invention, the read data may include a flag indicating whether an associated address exists within a given portion of the external storage. The given portion may be known to include secure data or known to not include secure data.

In another example embodiment of the present invention, the determination (at 310) may be based on a setting of the flag.

In another example embodiment of the present invention, the internal storage 230 may read a random number RN2 (at S320) and may transfer the random number RN2 to the random number comparator 240. If data stored in the internal storage 230 (hereinafter referred to as "internal data") is encrypted, the internal data may be decrypted (at S340).

In another example embodiment of the present invention, the random number comparator 240 may compare the random number RN1 extracted from the read data (at S320) stored in the external storage (hereinafter referred to as "external data") with the random number RN2 of the internal data (at S350). When the comparison indicates that the random numbers RN1 and RN2 are not identical, the CPU 250 may not execute the command from the host (e.g., because the external data may be modified).

In another example embodiment of the present invention, when the comparison indicates that the random numbers RN1 and RN2 are identical, the CPU 250 may execute the command from the host (at S360).

In another example embodiment of the present invention, the random number combining unit 270 may combine data generated after the execution of the command with a new random number RN3 generated (at S370) by the random number generator 260 (at S380). The encryption unit 280 may encrypt the data generated by the random number generator 260 (at S381). Alternatively, the encryption unit 280 may store the combined data at an address (e.g., the address from which the data is read at S300) of the external storage (at S382).

In another example embodiment of the present invention, the random number combining unit 270 may combine, the new random number RN3 with an address (e.g., the address from which the data is read at S300) of the external storage (at S390). The encryption unit 280 may encrypt the combined data generated by the random number combining unit 270 (at S391). Alternatively, the encryption unit 280 may store the combined data at an address (e.g., the address from which the data is read at S330) of the internal storage (at S392).

In another example embodiment of the present invention, after an execution of a command from the host (e.g., at S360), random numbers may be generated to be stored in an external storage and/or an internal storage. The random numbers stored in the external and/or internal storages may be compared to determine whether the external data is modified. In an example, if a user executes a command from a host to store modified data in internal/external storages under an abnormal situation (e.g., when a hacker copies the external storage to possess the copy), the user may become aware of the abnormal situation (e.g., based on a comparison between stored random numbers). Thus, a first random number stored in the external storage may be different than a second random number stored in the internal storage. In this manner, the external data may include a higher level of security. While above-described example embodiments have been described with respect to the microcontroller 200, it is understood that other example embodiments of the present invention may be applied to any device interacting with an external storage.

Figure 4:
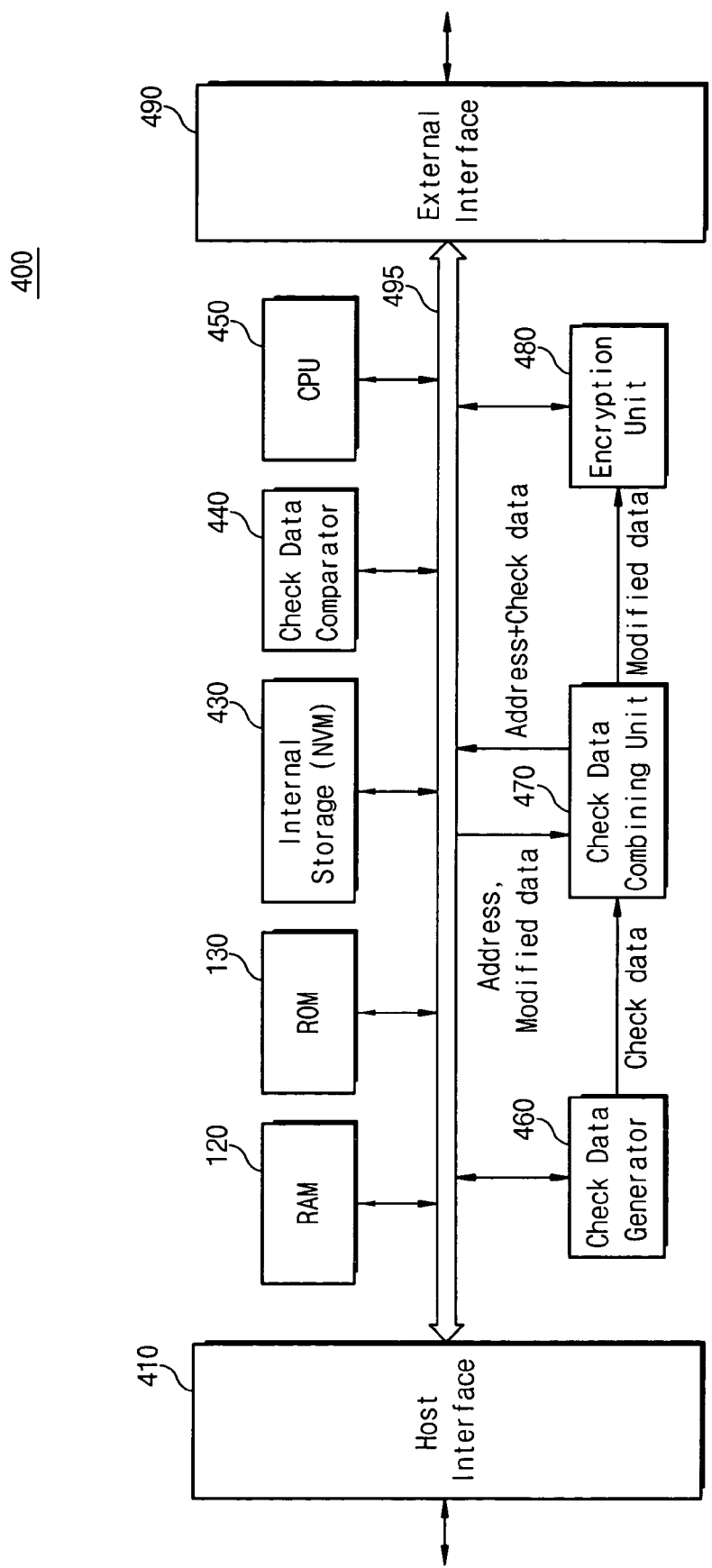
FIG. 4 illustrates a microcontroller according to another example embodiment of the present invention.

FIG. 4 illustrates a microcontroller 400 according to another example embodiment of the present invention. The microcontroller 400 may include a RAM 120, a ROM 130, an internal storage 430, a check data comparator 440, CPU 450, a check data generator 460, a check data combining unit 470, and/or an encryption unit 480. The microcontroller 400 may communicate with a host (not shown) through a host interface 410 and may communicate with an external storage (not shown) through an external interface 490. The components (e.g., RAM 120, ROM 130, internal storage 430, etc.) in the microcontroller 400 may be interconnected through a system bus 495.

In another example embodiment of the present invention, data stored in the components (e.g., RAM 120, ROM 130, internal storage 430, etc.) and/or data output from the components may be transferred to other components through the system bus 495.

In another example embodiment of the present invention, the random number comparator 440, the check data comparator 440, and/or the check data combining unit 470 may include an integrated circuit and/or an embedded program (e.g., firmware).

Figure 5:
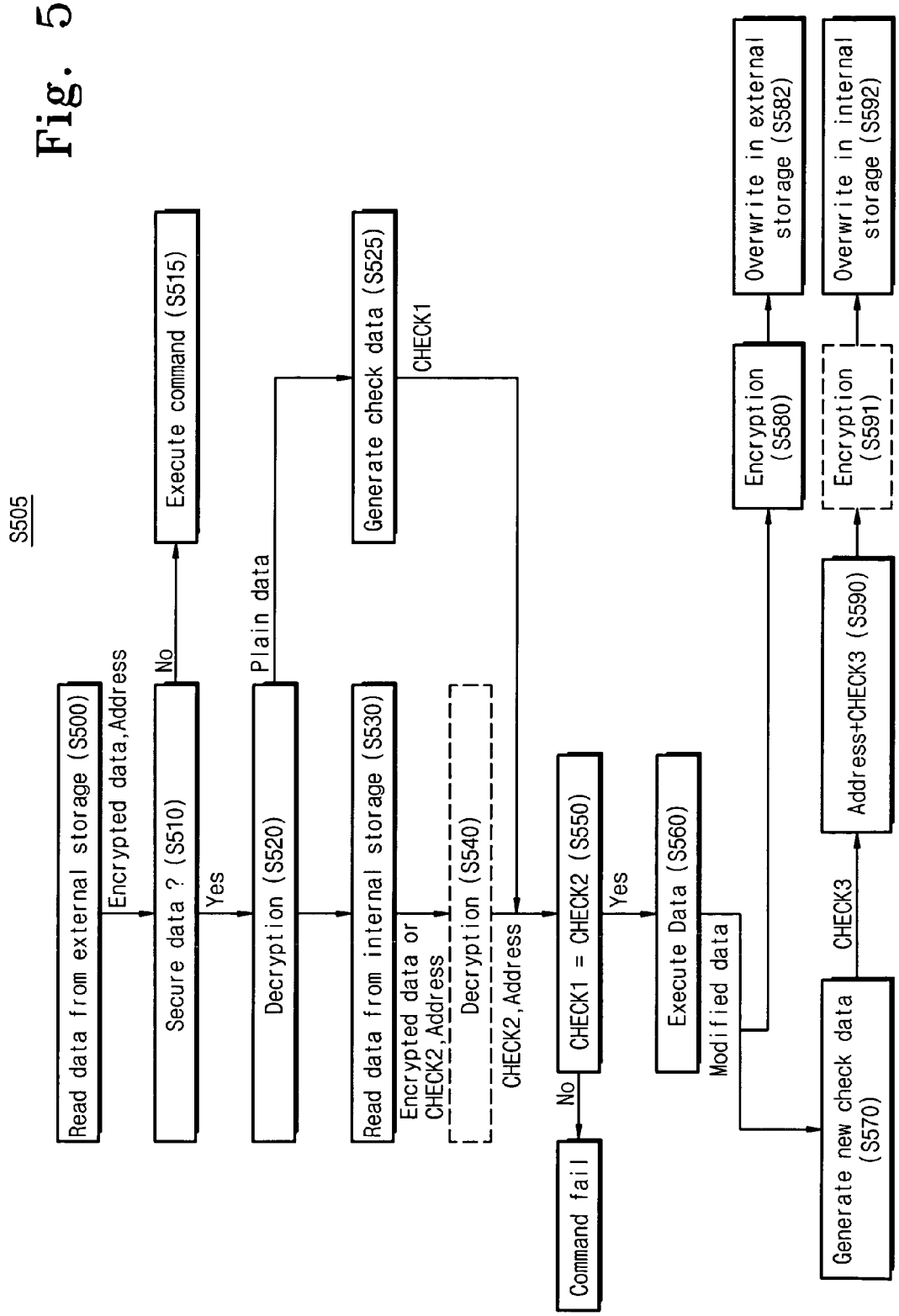
FIG. 5 illustrates a flowchart of another process according to another example embodiment of the present invention.

FIG. 5 illustrates a flowchart of a process 505 according to another example embodiment of the present invention.

In another example embodiment of the present invention, the process 505 may be performed by the microcontroller 400 of FIG. 4.

An example will now be given wherein the process 505 of FIG. 5 is described as performed by the microcontroller 400 of FIG. 4.

Referring to FIG. 4 and FIG. 5, the CPU 450 may read data from the external storage (not shown) (at S500) and may determine whether the read data is secure data (at S510). If the read data is not secure data, the CPU 450 may execute a command from the host (at S515). If the read data is secure data, the read data may be decrypted (e.g., if the read data is encrypted) in order to generate plain data (at S520).

In another example embodiment of the present invention, the read data may include a flag indicating whether an associated address exists within a given portion the external storage. The given portion may be known to include secure data or known to not include secure data.

In another example embodiment of the present invention, the determination (at S510) may be based on a setting of the flag.

In another example embodiment of the present invention, the check data generator 460 may generate check data CHECK1 (at S525) and may transfer the extracted check data CHECK1 to the check data comparator 440. The internal storage 430 may read check data CHECK2 of data stored in the internal storage which may correspond to the check data CHECK1 (e.g., at the external storage) and may transfer the read check data CHECK2 to the check data comparator 440. If the check data CHECK2 is encrypted, decryption may be executed (at S540).

In another example embodiment of the present invention, the check data comparator 440 may compare the check data CHECK1 with the check data CHECK2 (at S550). If the comparison indicates that the check data CHECK1 and CHECK2 are different from each other, the CPU 450 may not execute a command from a host (e.g., because the external data may be modified). If the comparison indicates that the check data CHECK1 and CHECK2 are identical, the CPU 450 may execute a command from the host (at S560).

The result of the command execution (at S560) may be received by the encryption unit 480 and the check data generator 460. The result may be encrypted at the encryption unit 480 (at S580). The encrypted result may be stored in the external storage (at S582) (e.g., in the address originally storing the read data at S500).

In another example embodiment of the present invention, the result of the command execution (at S560) may be received by the check data generator 460. The check data generator 460 may generate a check data CHECK3. The check data combining unit 470 may combine (at S590) the check data CHECK3 with an address (e.g., the address originally storing the read data at S500) associated with the external storage. The combined data may be encrypted at the encryption unit 480 (at S591) and the encrypted combined data may be stored in the external storage (at S592) (e.g., in the address originally storing the read data at S500). Alternatively, the combined data (at S590) may be stored in the external storage (at S592) without encryption.

In another example embodiment of the present invention, a command is executed. First check data may be generated based on the result of the command execution. The first check data may be stored in internal storage (e.g., which may be more secure than the external storage). Second check data may be generated based on data received from the external storage (e.g., which may be less secure than the internal storage). A comparison between the first and second check data may indicate whether the external data has been modified. Thus, a user may detect abnormal operations (e.g., initiated by a hacker) on external data.

In another example embodiment of the present invention, the first and second check data may be smaller than the data being checked. Thus, additional security may be provided without significantly increasing memory storage requirements (e.g., in the internal and/or external storage).

The example embodiments of the present invention being thus described, it will be obvious that the same may be varied in many ways. For example, while the above-described example embodiments are directed to a microcontroller and system including a microcontroller, other example embodiments may be directed to any system and/or device including an external storage.

Such variations are not to be regarded as a departure from the spirit and scope of the example embodiments of the present invention, and all such modifications as would be obvious to one skilled in the art are intended to be included within the scope of the following claims.

What is claimed is:

1. A microcontroller, comprising:
   a data generator configured to generate first data;
   a first storage configured to store the first data and an address of a second storage;
   a central processing unit (CPU) configured to execute a command based on a comparison between the first data and second data;
      wherein the second data is extracted from data read from the address of the second storage, the first data includes a first random number and the second data includes a second random number, and the data generator generates a third random number after the execution; and
   a random number combining unit configured to combine the third random number and the address to generate a combined random number.

2. The microcontroller of claim 1, wherein the CPU executes the command when the comparison indicates that the first and second random numbers are identical.

3. The microcontroller of claim 1, wherein the second storage is included within an external storage.

4. The microcontroller of claim 3, wherein the second storage is within a given portion of the external storage, the given portion indicating whether stored data is secure data.

5. The microcontroller of claim 1, wherein the comparison is executed with an embedded program.

6. The microcontroller of claim 1, wherein the comparison is executed with a random number comparator.

7. The microcontroller of claim 1, further comprising:
   an encryption unit for encrypting the combined random number and storing encrypted data in an external storage.

8. A microcontroller, comprising:
   a data generator configured to generate first data;
   a first storage configured to store the first data and an address of a second storage;
   a central processing unit (CPU) configured to execute a command based on a comparison between the first data and second data;
      wherein the second data is extracted from data read from the address of the second storage, the first data includes first check data and the second data includes second check data, and the data generator generates the second check data based on a result of the execution; and
   a check data combining unit configured to combine the second check data with the address to generate check combine data.

9. The microcontroller of claim 8, wherein the second storage is within a given portion of an external storage, the given portion indicating whether stored data is secure data.

10. The microcontroller of claim 8, wherein the first check data is extracted using an embedded program.

11. The microcontroller of claim 8, further comprising:
a check data extractor configured to extract the second check data from the second data.

12. A microcontroller, comprising:
a data generator configured to generate first data;
a first storage configured to store the first data and an address of a second storage;
a central processing unit (CPU) configured to execute a command based on a comparison between the first data and second data;
wherein the second data is extracted from data read from the address of the second storage, and the first data includes first check data and the second data includes second check data; and
an encryption unit configured to encrypt a result of the execution and storing the encrypted result in the storage.

13. A method of securing data, comprising:
reading first data from a first storage;
reading second data from a second storage;
extracting third data from the first data;
extracting fourth data from the second data, wherein the third data is a first number and the fourth data is a second number;
comparing at least a portion of the third and fourth data;
executing a command based on a result of the comparison;
generating a third number; and
combining the third number with an address associated with a storage location of the first data to generate a combined number data, wherein the third number is a random number.

14. The method of claim 13, wherein the first storage is an external storage and the second storage is an internal storage.

15. The method of claim 13, wherein the first and second numbers are random numbers.

16. The method of claim 13, wherein a result indicates that the first and second numbers are identical.

17. The method of claim 13, wherein the first data is stored in an external storage.

18. A microcontroller for performing the method of claim 13.

19. A system for performing the method of claim 13.

20. A method of securing data, comprising:
reading first data from a first storage;
reading second data from a second storage;
extracting third data from the first data;
extracting fourth data from the second data, wherein the third data is a first number and the fourth data is a second number;
comparing at least a portion of the third and fourth data;
executing a command based on a result of the comparison;
generating a third number; and
combining the third number with an execution result to generate a combined number,
wherein the third number is a random number.

21. The microcontroller of claim 20, further comprising:
encrypting the combined number.

22. The method of claim 20, wherein the third data is first check data and the fourth data is second check data.

23. The method of claim 22, wherein the first storage is an external storage and the second storage is an internal storage.

24. The method of claim 22, wherein a result indicates that the first and second check data are identical.

25. The method of claim 22, wherein the first data is stored in an external storage.

26. The method of claim 22, further comprising:
generating a third check data.

27. The method of claim 26, further comprising:
combining the third check data with an address associated with a storage location of the first data to generate a combined check data.

28. The method of claim 22, further comprising:
encrypting a result of the execution.

29. A microcontroller, comprising:
a data generator configured to generate first data;
a first storage configured to store the first data and an address of a second storage;
a decryption unit configured to extract third data from the first data and fourth data from second data; and
a central processing unit (CPU) configured to execute a command based on a comparison between third data and the fourth data,
wherein the second data is extracted from data read from the address of the second storage.

* * * * *